(12) United States Patent
Ko et al.

(10) Patent No.: US 9,151,842 B2
(45) Date of Patent: Oct. 6, 2015

(54) METHOD AND APPARATUS FOR TIME OF FLIGHT SENSOR 2-DIMENSIONAL AND 3-DIMENSIONAL MAP GENERATION

(75) Inventors: Dong-Ik Ko, McKinney, TX (US); Nara Won, Irvine, CA (US); Debasish Nag, Richardson, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 441 days.

(21) Appl. No.: 13/294,560

(22) Filed: Nov. 11, 2011

(65) Prior Publication Data

US 2012/0121165 A1    May 17, 2012

Related U.S. Application Data

(60) Provisional application No. 61/413,030, filed on Nov. 12, 2010, provisional application No. 61/413,068, filed on Nov. 12, 2010, provisional application No. 61/413,227, filed on Nov. 12, 2010.

(51) Int. Cl.
*G06K 9/00* (2006.01)
*G01S 17/89* (2006.01)

(52) U.S. Cl.
CPC .................................. *G01S 17/89* (2013.01)

(58) Field of Classification Search
None
See application file for complete search history.

(56) References Cited

U.S. PATENT DOCUMENTS

2007/0237363 A1\* 10/2007 Hagio et al. .................. 382/106

\* cited by examiner

*Primary Examiner* — Kim Vu
*Assistant Examiner* — Fred Hu
(74) *Attorney, Agent, or Firm* — Mima Abyad; Frank D. Cimino

(57) ABSTRACT

A method and apparatus for Time Of Flight sensor 2-dimensional and 3-dimensional map generation. The method includes retrieving Time Of Flight sensor fixed point data to obtain four phases of Time Of Flight fixed point raw data, computing Gray scale image array and phase differential signal arrays utilizing four phases of TOF fixed point raw data, computing Gray image array and Amplitude image array for fixed point, converting the phase differential signal array from fixed point to floating point, performing the floating point division for computing Arctan, TOF depthmap, and 3-dimensional point cloud map for Q format fixed point, and generating depthmap, 3-dimensional cloud coefficients and 3-dimensional point cloud for Q format fixed point.

6 Claims, 5 Drawing Sheets

- LDCNT
  - COUNT THE NUMBER OF LEADING 0s(OR 1s) CORRESPONDING INPUT DATA

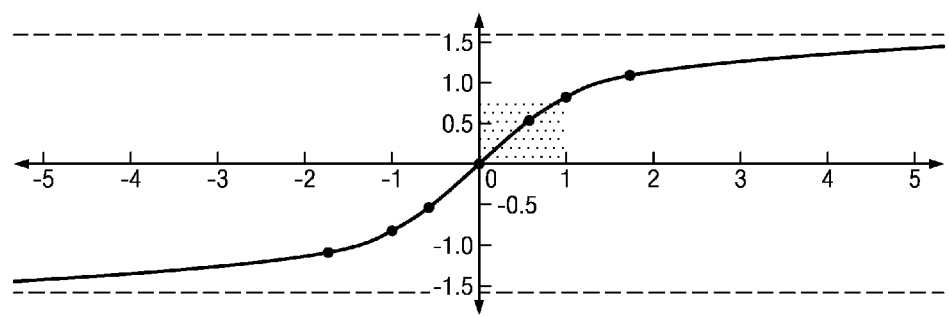
*FIG. 5*
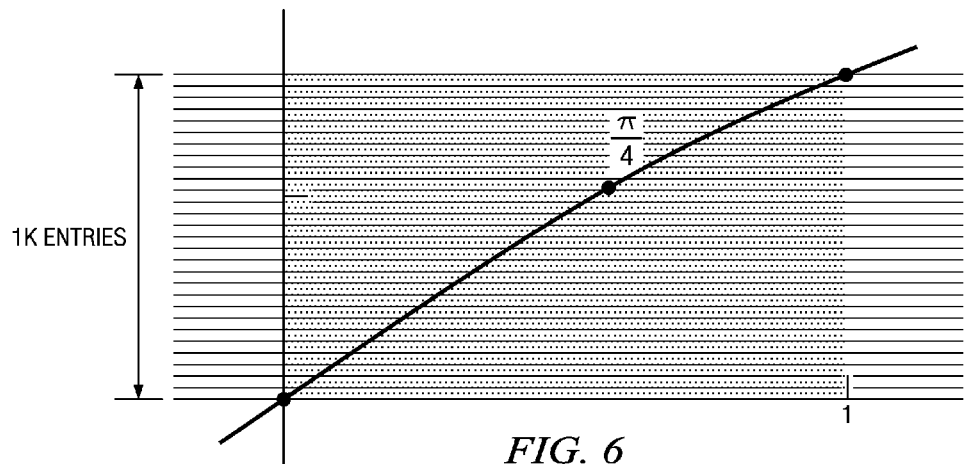
*FIG. 6*
$$\varphi = \arctan(\frac{x}{y}), x \leq y$$
$$0 \leq \varphi \leq \frac{\pi}{4}$$ → ARCTAN LUT 1K ENTRIES
*FIG. 7*

METHOD AND APPARATUS FOR TIME OF FLIGHT SENSOR 2-DIMENSIONAL AND 3-DIMENSIONAL MAP GENERATION

CROSS-REFERENCE TO RELATED APPLICATIONS

This application claims benefit of U.S. provisional patent application Ser. No. 61/413,227, 61/413,030, 61/413,068, all filed Nov. 12, 2010, which are herein incorporated by reference.

BACKGROUND OF THE INVENTION

1. Field of the Invention

Embodiments of the present invention generally relate to a method and apparatus for time of flight (TOF) sensor 2-dimensional and 3-dimensional map generation.

2. Description of the Related Art

TOF (Time Of Flight) based sensor captures TOF raw data. TOF raw data array is converted to depth map and then to 3-dimensional point cloud, which are ultimately used for 3-dimensional map array. As 2-dimensional image map array, TOF amplitude image array and gray scale array are obtained.

These operations inevitably require expensive operations, such as, recursive computation, iterative computation, floating point multiplication, floating point division and the like. These features prevent obtaining the real-time processing of TOF based vision systems and make it difficult to perform parallel processing.

Floating point division is a commonly and frequently used operation for 3-dimensional vision applications. However, this is a considerably expensive operation and makes it difficult to support a real-time processing of DSP, vision, and image applications.

Furthermore, arctan function is a heavily computed expensive operation on general purpose processing units, which also prevents real-time processing of DSP, vision, and Image applications. In addition, vector processing is difficult due to intrinsic operational characteristics of arctan and its dependency on angle regions. Ultimately, arctan operation is one of bottleneck for 3-dimensional vision applications.

Therefore, there is a need for a method and/or apparatus for improving the generation of 2-dimensional and 3-dimensional maps in TOF sensors and cameras.

SUMMARY OF THE INVENTION

Embodiments of the present invention relate to a method and apparatus for Time Of Flight sensor 2-dimensional and 3-dimensional map generation. The method includes retrieving Time Of Flight sensor fixed point data to obtain four phases of Time Of Flight fixed point raw data, computing Gray scale image array and phase differential signal arrays utilizing four phases of TOF fixed point raw data, computing Gray image array and Amplitude image array for fixed point, converting phase differential signal array from fixed point to floating point, performing floating point division for computing Arctan, TOF depthmap, and 3-dimensional point cloud map for Q format fixed point, and generating depthmap, 3-dimensional cloud coefficients and 3-dimensional point cloud for Q format fixed point.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 5 is an embodiment of an arctan inverse triangular graph;

FIG. 6 is an embodiment of an arctan look-up table region, 0-45 degrees;

FIG. 7 is an embodiment of a linear region look-up table based arctan y; and

DETAILED DESCRIPTION

In one embodiment, a vector is processed for a 2-dimensional image map (Gray sale image array, Amplitude image array) and for a 3-dimensional map (Depth map array and 3-dimensional point cloud map array) in a pipelined way by applying the combined computation of fixed point and floating point operations along with a parallel model of arctan inverse triangular computation and a parallel model of floating point emulation. Each output vector is generated in different data format, fixed or Q format fixed depending on each output array's precision requirement for vision applications. Whereas, existing solutions use ASIC/FPGA based hardwired approach to support a real-time processing or high clock rate processing units by applying expensive recursive/or iterative computations and floating point computation logics.

Thus data format and computation model is optimized depending on data precision requirements, which is different for each level of usage in conjunction with data and task parallel model. Such an embodiment allows for a high performance comparable to hardwired approach (ASIC/FPGA) and also supports a full flexibility with programmability. In return, some advantages are: allowing for extremely fast computation performance without a hard wired logic, allowing for a full flexibility with programmability, and supporting dynamically reconfigurable precision range depending on vision application algorithms.

In one embodiment, a vector process for floating point division calculation is performed utilizing inverse mantissa look-up table access. Inverse mantissa look-up table based floating point division emulation may replace the expensive recursive/or iterative based floating point division and may allow for a comparable performance without an expensive hard wired floating point unit. Further more, such an embodiment allows for a vector processing of an array of floating point division with a sign mask array map and a saturation mask. These masks can remove any conditional operation which prevents parallelism and enables pipelined vector processing features.

Figure 1:
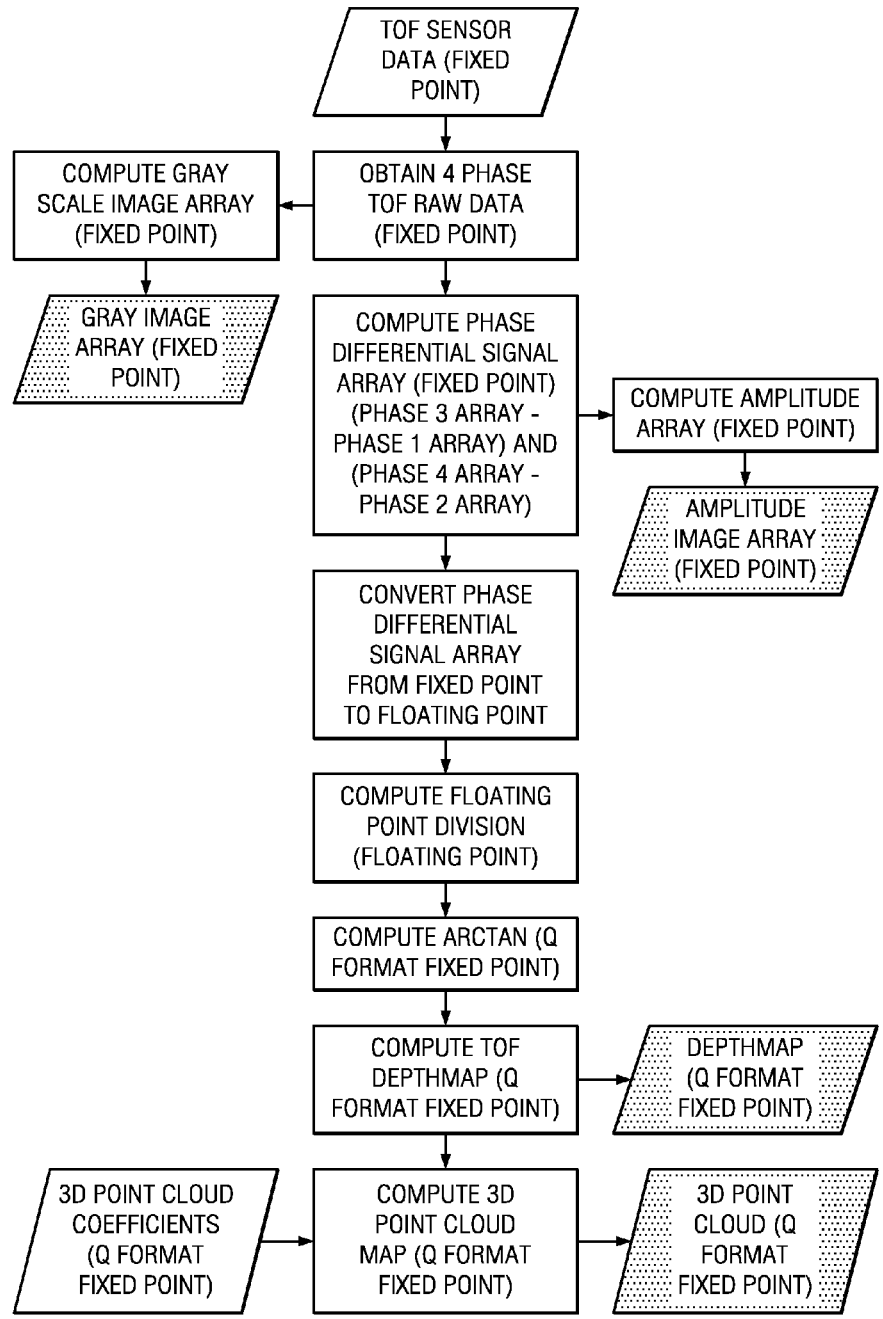
FIG. 1 is an embodiment of a flow diagram of a method for Time Of Flight sensor 2-dimensional and 3-dimensional map generation and method.

FIG. 1 is an embodiment of a flow diagram of a method for Time Of Flight sensor 2-dimensional and 3-dimensional map generation and method. As shown in FIG. 1, TOF sensor fixed point data is utilized to obtain 4 phases of TOF fixed point raw data. 4 phases of TOF fixed point raw data are used to compute Gray scale image array and phase differential signal arrays. As a result, Gray image array and Amplitude image array for fixed point is generated. After converting the phase differential signal array from fixed point to floating point, floating point division is performed for computing Arctan, TOF depthmap, and 3-dimensional point cloud map for Q format fixed point. As a result, depthmap, 3-dimensional cloud coefficients and 3-dimensional point cloud for Q format fixed point are outputted.

Figure 2:
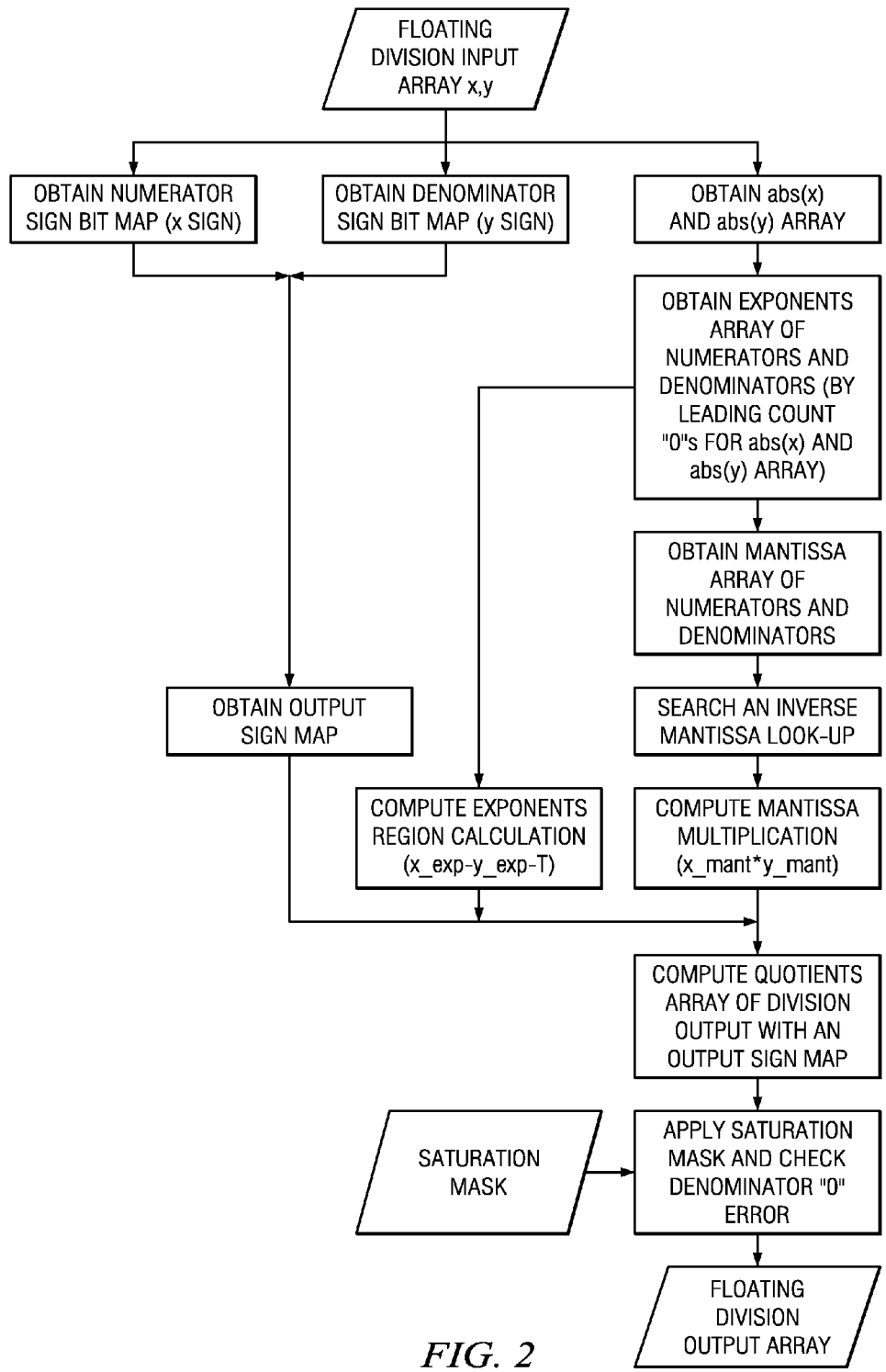
FIG. 2 is an embodiment of a flow diagram, for a method for Inverse mantissa look-up based fast floating point division vector processing.

FIG. 2 is an embodiment of a flow diagram, for a method for Inverse mantissa look-up based fast floating point division vector processing. FIG. 2 describes in detail the steps of converting phase differential signal array from fixed point to floating point and the step of computing floating point division of FIG. 1. As shown in FIG. 2, utilizing x and y of floating division, numerator sign bit map (x sign), denominator sign bit map (y sign) and absolute value x and y array are obtained. The output sign map is obtaining utilizing the numerator sign bit map (x sign) and the denominator sign bit map (y sign). Exponents array of numerators and denominators are obtained by leading count zeros for the absolute values of x and y arrays, which is utilized to obtain the mantissa array of numerators and denominators. After searching the inverse mantissa lookup table, the mantissa multiplication and exponents region calculation are computed, which are used with the output sign map to compute the quotients array of division output with an output sign map. Applying the saturation mask and checking for denominator zero error, the saturation mask and floating division out array are generated.

Figure 3:
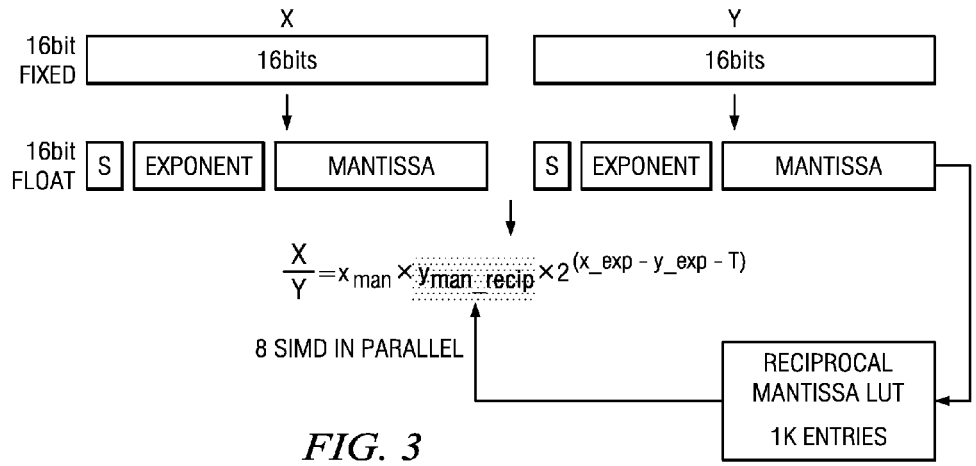
FIG. 3 is an embodiment of a changing floating point division to multiplication computation problem with an inverse look-up table.
Figure 4:
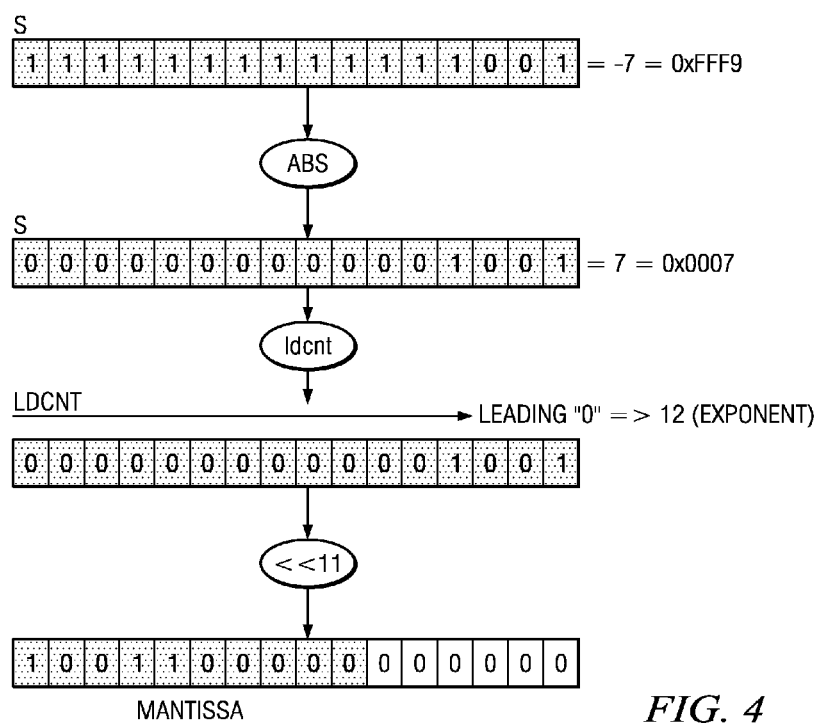
FIG. 4 is an embodiment of mantissa and exponent extraction from a fixed point number before indexing an inverse mantissa look-up table.

FIG. 3 is an embodiment of changing a floating point division to multiplication computation problem with an inverse look-up table, as described in more detail in FIG. 2. FIG. 3 shows how a floating point division is changed to multiplication computation problem with a relatively small inverse mantissa look-up table based operation. Whereas, FIG. 4 is an embodiment of mantissa and exponent extraction from a fixed point number before indexing an inverse mantissa look-up table of FIG. 2. FIG. 4 shows how each mantissa and exponent is extracted from a fixed point number before indexing an inverse mantissa look-up table. FIG. 2 shows the overall algorithm flow chart on how the suggested invention handles array of floating point division in parallel.

In one embodiment, a vector is processed for arctan calculation by tackling a linear region look-up table arctan angle for non-linear region, which ultimately is a full range of angle (0~360 degree) with full parallelism. FIG. 5 is an embodiment of an arctan inverse triangular graph. FIG. 5 shows arctan graph characteristics. Here, arctan graph shows a steep slope curve after 45 degree region. To solve this, a non linear region, recursive or iterative arctan computation is widely used. Even though this approach allows for a high precision result, this is a very expensive operation for an embedded vision system and is not applicable to parallel processing also. However, utilizing a linear region look-up table based arctan computation with parallelism to cover the whole angle range allows for a high precision result without an expensive operation.

FIG. 6 is an embodiment of an arctan look-up table region, 0-45 degrees. FIG. 6 shows 1K fine sliced grid of arctan region (0~45). In this embodiment, each entry in the look-up has 16 bits data and allows 0.000766 radius degree which fully supports 3-dimensional vision applications' precision requirements.

FIG. 7 is an embodiment of a linear region look-up table based arctan y. In one embodiment, as shown in FIG. 7, only 2K byte look-up table arctan which is off-line computed is stored in buffer memory. To apply a linear region to a full range of angle, a numerator of arctan input is smaller than or equal to a denominator. Here, a conditional operation blocks a vector processing parallelism. To allow a vector processing of arctan look-up access, I suggest a comparison mask map which holds the information of the comparison of a numerator and a denominator in each arctan input vector and an angle conversion mask map which holds the information of converting (-phi,phi) angle range to (0,2*phi) angle range.

Figure 8:
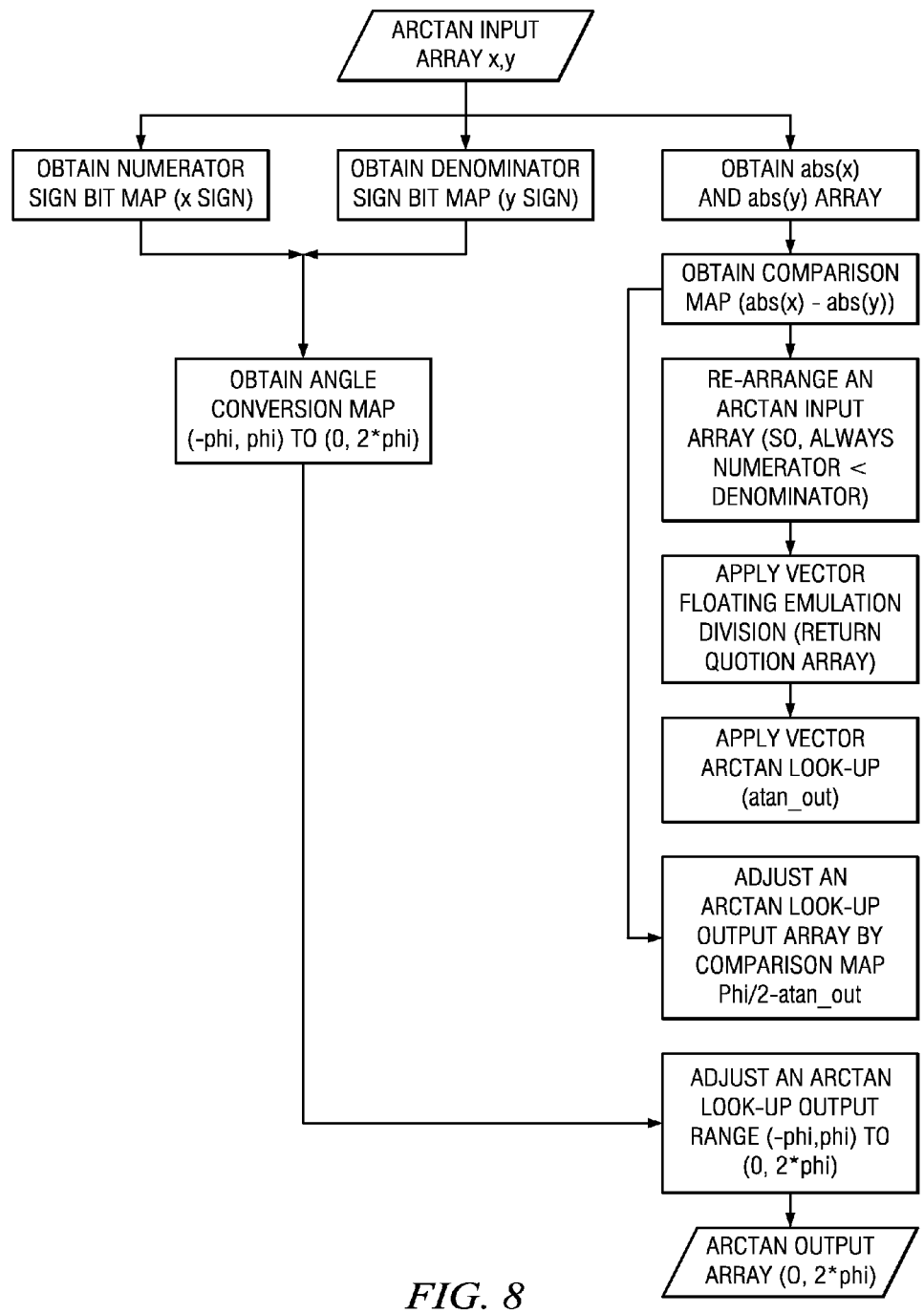
FIG. 8 is a flow diagram depicting an embodiment of a method for algorithm of linear look-up based arctan vector processing.

FIG. 8 is a flow diagram depicting an embodiment of a method for algorithm of linear look-up based arctan vector processing. As shown in FIG. 8, utilizing x and y of the arctan input array, numerator sign bit map (x sign), denominator sign bit map (y sign) and absolute value x and y array are obtained. The angle conversion map is obtained utilizing the numerator sign bit map (x sign) and the denominator sign bit map (y sign). Comparison map is obtained utilizing the absolute value x and y array. after rearranging the arctan input array so that the numerator is less than or equal to the denominator, a vector floating point emulation division is applied to return a quotient array. The arctan look-up output array is adjusted utilizing the comparison map and the vector arctan look-up. The arctan output range is generated utilizing the arctan look-up output range and the angle conversion map.

Thus, by applying a fine grained look-up table for a linear region (0~45 degree) to non-linear region with triangular math, a look-up table based arctan calculation allows extremely faster result compared to series, fraction or integral based inverse trigonometric function with fair precision for vision/image applications. In addition, the look-up table based arctan approach allows the operation applicable to parallelism on SIMD processor.

While the foregoing is directed to embodiments of the present invention, other and further embodiments of the invention may be devised without departing from the basic scope thereof, and the scope thereof is determined by the claims that follow.

What is claimed is:

1. A method of a digital processor for Time Of Flight sensor 2-dimensional and 3-dimensional map generation, comprising:
retrieving Time Of Flight sensor fixed point data to obtain four phases of Time Of Flight fixed point raw data;
computing Gray scale image array and phase differential signal arrays utilizing four phases of Time Of Flight (TOF) fixed point raw data;
computing Gray image array and Amplitude image array for fixed point;
converting the phase differential signal array from fixed point to floating point, wherein the converting comprises:
obtaining x and y of floating division, numerator sign bit map for x sign, denominator sign bit map for y sign and absolute value x and y array;
obtaining an output sign map utilizing the numerator sign bit map for x sign and the denominator sign bit map for y sign;
obtaining exponents array of numerators and denominators by leading count zeros for the absolute values of x and y arrays;

obtaining a mantissa array of numerators and denominators;
searching an inverse mantissa lookup table,
computing mantissa multiplication and exponents region calculation for utilizing with the output sign map for computing the quotients array of division output with the output sign map;
applying a saturation mask and checking for denominator zero error; and
generating the saturation mask and floating division out array;
performing the floating point division for computing Arctan, TOF depthmap, and 3-dimensional point cloud map for Q format fixed point; and
generating depthmap, 3-dimensional cloud coefficients and 3-dimensional point cloud for Q format fixed point.

2. The method of claim 1, wherein the step of computing arctan comprises:
obtaining x and y of an arctan input array, numerator sign bit map, denominator sign bit map for y sign and absolute value x and y array;
obtaining angle conversion map utilizing the numerator sign bit map for x sign and the denominator sign bit map for y sign;
obtaining comparison map utilizing the absolute value x and y array;
rearranging the arctan input array wherein the numerator is at least one of less than and equal to the denominator;
applying a vector floating point emulation division for returning a quotient array;
adjusting an arctan look-up output array utilizing the comparison map and the vector arctan look-up; and
generating an arctan output range utilizing the arctan look-up output range and the angle conversion map.

3. A non-transitory computer readable medium with executable computer instruction stored thereon, when executed, performs a method for Time Of Flight sensor 2-dimensional and 3-dimensional map generation, the method comprising:
retrieving Time Of Flight sensor fixed point data to obtain four phases of Time Of Flight fixed point raw data;
computing Gray scale image array and phase differential signal arrays utilizing four phases of Time Of Flight fixed point raw data;
computing Gray image array and Amplitude image array for fixed point;
converting the phase differential signal array from fixed point to floating point, comprising:
obtaining x and y of the floating division, numerator sign bit map for x sign, denominator sign bit map for y sign and absolute value x and y array;
obtaining an output sign map utilizing the numerator sign bit map for x sign and the denominator sign bit map for y sign;
obtaining exponents array of numerators and denominators by leading count zeros for the absolute values of x and y arrays;
obtaining a mantissa array of numerators and denominators;
searching an inverse mantissa lookup table,
computing mantissa multiplication and exponents region calculation for utilizing with the output sign map for computing the quotients array of division output with an output sign map;
applying a saturation mask and checking for denominator zero error; and
generating the saturation mask and floating division out array;
performing the floating point division for computing Arctan, Time Of Flight depthmap, and 3-dimensional point cloud map for Q format fixed point; and
generating depthmap, 3-dimensional cloud coefficients and 3-dimensional point cloud for Q format fixed point.

4. The non-transitory computer readable medium of claim 3, wherein the step of computing arctan comprises:
obtaining x and y of the arctan input array, numerator sign bit map, denominator sign bit map for y sign and absolute value x and y array;
obtaining angle conversion map utilizing the numerator sign bit map for x sign and the denominator sign bit map for y sign;
obtaining comparison map utilizing the absolute value x and y array; p;
rearranging an arctan input array wherein the numerator is at least one of less than and equal to the denominator;
applying a vector floating point emulation division for returning a quotient array;
adjusting an arctan look-up output array utilizing the comparison map and the vector arctan look-up; and
generating an arctan output range utilizing the arctan look-up output range and the angle conversion map.

5. An apparatus for Time Of Flight sensor 2-dimensional and 3-dimensional map generation, comprising:
a readable medium for archiving data couple to the digital processor;
a digital processor couple to the readable medium for performing a method, the method comprising:
retrieving Time Of Flight sensor fixed point data to obtain four phases of Time Of Flight fixed point raw data;
computing Gray scale image array and phase differential signal arrays utilizing four phases of Time Of Flight (TOF) fixed point raw data;
computing Gray image array and Amplitude image array for fixed point;
converting the phase differential signal array from fixed point to floating point, wherein the converting comprises:
obtaining x and y of floating division, numerator sign bit map for x sign, denominator sign bit map for y sign and absolute value x and y array;
obtaining an output sign map utilizing the numerator sign bit map for x sign and the denominator sign bit map for y sign;
obtaining exponents array of numerators and denominators by leading count zeros for the absolute values of x and y arrays;
obtaining a mantissa array of numerators and denominators;
searching an inverse mantissa lookup table,
computing mantissa multiplication and exponents region calculation for utilizing with the output sign map for computing the quotients array of division output with the output sign map;
applying a saturation mask and checking for denominator zero error; and
generating the saturation mask and floating division out array;
performing the floating point division for computing Arctan, TOF depthmap, and 3-dimensional point cloud map for Q format fixed point; and generating depthmap, 3-dimensional cloud coefficients and 3-dimensional point cloud for Q format fixed point.

6. The apparatus of claim 5, wherein the step of computing arctan comprises:
    obtaining x and y of an arctan input array, numerator sign bit map, denominator sign bit map for y sign and absolute value x and y array;
    obtaining angle conversion map utilizing the numerator sign bit map for x sign and the denominator sign bit map for y sign;
    obtaining comparison map utilizing the absolute value x and y array;
    rearranging the arctan input array wherein the numerator is at least one of less than and equal to the denominator;
    applying a vector floating point emulation division for returning a quotient array;
    adjusting an arctan look-up output array utilizing the comparison map and the vector arctan look-up; and
    generating an arctan output range utilizing the arctan look-up output range and the angle conversion map.

* * * * *